July 27, 1926.
H. L. STRONGSON
1,594,224
CABLE BOX AND CONNECTER
Original Filed Dec. 4, 1922
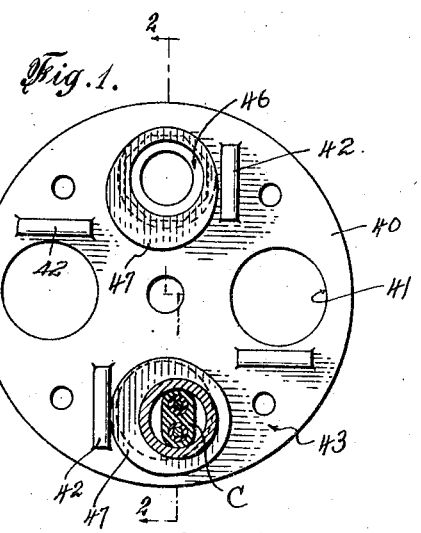
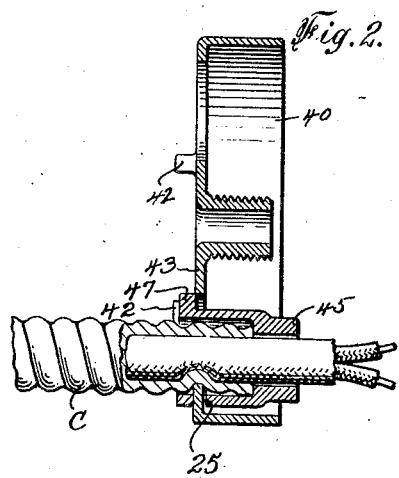
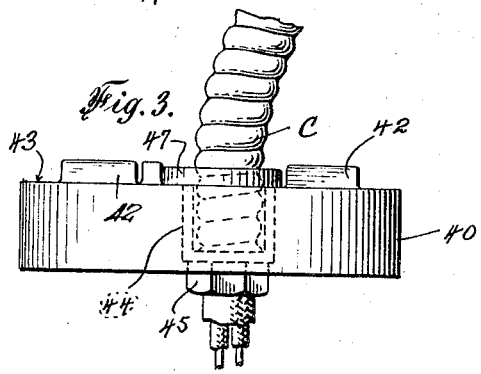
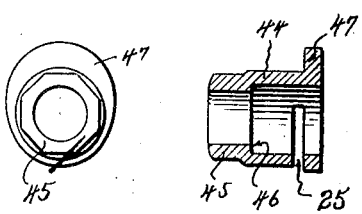
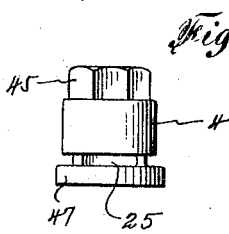
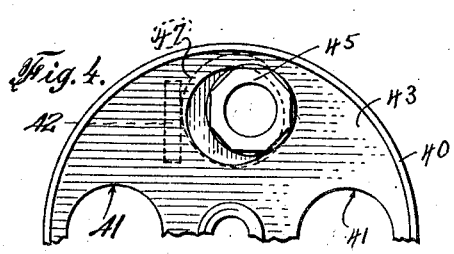
INVENTOR
Herman L. Strongson
BY
Colliber+ Ledbetter
ATTORNEYS Patented July 27, 1926.

1,594,224

UNITED STATES PATENT OFFICE.

HERMAN L. STRONGSON, OF NEW YORK, N. Y., ASSIGNOR TO THE THOMAS & BETTS CO., OF ELIZABETH, NEW JERSEY, A CORPORATION OF NEW JERSEY.

CABLE BOX AND CONNECTER.

Original application filed December 4, 1922, Serial No. 604,677. Divided and this application filed March 10, 1925. Serial No. 14,397.

This invention relates to improved cable connecters and electrical fixture boxes in combination therewith, the object being generally to improve their construction and mode of assembly and ease with which a cable may be anchored to a box.

One of the main purposes of the invention is to produce an improved cable connecter which is capable of fastening itself and a cable in the round cable hole or knock-out opening of a box and to accomplish this without the use of screws or other similar fastening means connecting directly to the box. The connecter is preferably constructed in the form of a sleeve which is provided with a box wall entrant slot or equivalent cut away portion for the reception of the box hole edge, the said entrant slot performing a double purpose, namely, the anchorage of the connecter to the box without any other appliances such as screws and the like so frequently employed, and which slot is also used to permit the edge of the box to pass through the sleeve and press directly against the cable thereby clamping and pressing the cable directly against the edge of the box hole which establishes good mechanical and electrical connection between the cable and box without employing screws or nuts to do so.

This application is a division of my patent application Serial No. 604,677, filed December 4, 1922, and in this application for patent I cover the improvement of fastening a cable and connecter within a standard size round box hole.

The accompanying drawing illustrates a preferred form of the invention serving to show an embodiment thereof and the principle involved whereby the connecter itself carries the means by which the fastening function is accomplished instead of having to fasten a screw into a box as in many patented connecters.

Figure 1 shows a bottom view of the improved box and connecter with two connecters in the box. The lower connecter has its cam worked around in tight compressing position against the box to anchor a cable thereto, while the upper connecter is free in the box with no cable attached.

Figure 2 shows a sectional view taken on the line 2—2 of Figure 1.

Figure 3 shows a side view of Figure 1.

Figure 4 shows a fragmentary inside view of the box with a connecter loosely placed therein and with the cable left out of the connecter, this view being taken from the opposite side of Figure 1.

Figure 5 is a cluster view of the cable connecter detached from the box showing end and side elevations, and showing a longitudinal section.

The cable box 40 is made with standard size round knock-out holes 41 for the reception of the end of a cable C and for the reception of the sleeve connecter to be described. A rib 42 is made adjacent each opening 41 and is thus placed to engage the sleeve connecter used in anchoring the cable to the box. The rib may be placed at any point on the box as will provide the best results, but ribs placed on top of the box serve to maintain clearance between the box and the wall of a building so as to permit the cam on the connecter to freely turn and not bind against the wall. The improved connecter for use in combination with this box will now be described, but it is to be noted that the particular box and rib 42 is not essential for ordinary standard type boxes may in fact be used.

The sleeve connecter shown in Figure 5 is removed from the box to better disclose its construction, and it is observed that the connecter embodies a sleeve 44 having a wrench end or head 45 on one end together with a cable stop or shoulder 46 which may be cast in the sleeve if desired. The other end of the sleeve carries a flange cover cam 47 sufficiently large to lap over and cover the edges defining the knock-out opening 41 in the box, and sufficiently large to reach the rib 42 for engagement therewith when the sleeve is rotated. An entrant slot 25 is made in the sleeve 44 preferably adjacent the cam 47 to bring the flange in close contact with the wall 43 of the cable box. The flange 47 performs the double purpose of covering the box knock-out hole at all times thereby providing a sealed box, and at the same time acts as a cam to force the parts into locked position by forcing the edge of the box hole 41 through the connecter slot against the cable.

By placing an empty connecter 44 inside the knock-out 41, then placing a cable end within the connecter to overlie the slot 25 and by slightly rotating the connecter, the cam is caused to engage the rib 42 thereby producing a camming action which causes the sleeve 44 to slide away from the center of the knock-out and along the box wall edge 43 until the said edge 43 passes far into the entrant slot 25 which attaches the connecter 44 to the cable box and at the same time pinches the cable against the box wall edge.

The anchorage of the connecter in the box and the cable in the connecter is thus accomplished without the use of screws which represents economy in manufacturing this class of electrical fittings and it is observed that one end of the sleeve projects into the box while the other end thereof projects outside the box. In this way the sleeve braces itself in the box. The slot 25 receives the box wall edge which serves to lock the sleeve against longitudinal movement and it is unnecessary to fasten a screw into the box to hold the sleeve against longitudinal motion.

The sleeve slot 25 performs a double function in that it affords an overlapping connecter anchorage means which abuts against both in and outside box wall surfaces adjacent the box hole edge and thereby prevents longitudinal displacement of the connecter in the box, and furthermore the slot receives the exposed box hole edge into the sleeve to grip the cable between the sleeve and box hole edge. In effect, the sleeve passes through the box wall and the box wall edge passes through the sleeve wall which results in an interlocking of the two parts. The wall entrant slot is one example of means to permit the box hole edge to gain access and expose itself eccentrically into the connecter and the sleeve may be designed in other ways to accomplish this purpose.

What I claim is:—

1. Cable and box connecting means comprising, a box having a cable and connecter receiving hole, a connecter member of such size as will fit into said box hole, said member being provided with spaced means abutting the opposite box wall surfaces adjacent the box hole to anchor the member in the box against longitudinal displacement and formed to expose a portion of the box hole edge directly to a cable placed therein, and said connecter member including a cam which coacts with the box to grip a cable between the connecter and exposed box hole edge.

2. In combination, an electric fixture box provided with a round cable opening into which a cable end is introduced, a sleeve received into the round cable opening and adapted to surround the cable, a tool-head on the sleeve by which the sleeve may be rotated, said sleeve provided with an entrant slot over which the cable lies and said slot registering with the edge of the cable opening which holds the sleeve against longitudinal movement relatively to the box, a cam carried by the sleeve, and said box including means adjacent the round hole against which the cam engages when the sleeve rotates which results in forcing the edge of the box opening through the sleeve slot to pinch against the cable serving to anchor all parts together.

3. In combination, an electric fixture box provided with the usual round cable opening into which a cable end is introduced, a sleeve received into the round cable opening and adapted to surround the cable, a tool-head on the sleeve by which the sleeve may be rotated, said sleeve provided with an entrant slot over which the cable lies and said slot registering with the edge of the cable opening, which holds the sleeve against longitudinal movement relatively to the box, a cam carried by the sleeve, and a rib made on the box wall against which the cam rotates to force the sleeve sidewise and thus bring the edge of the cable box opening through the entrant slot against the cable with great pressure to hold all parts together.

4. In combination, an electric fixture box provided with the usual round opening in the wall thereof to receive a cable and a connecter, a sleeve inserted in the opening and into which the cable is inserted, said sleeve being longer than the depth of the box, said sleeve made with a box edge entrant slot over which the cable lies and which slot registers with the edge of the round opening in the box; said entrant slot serving a double purpose namely, to secure the connecter to the box wall, and to permit the box opening edge to reach through the sleeve and pinch into the cable; a rib made on the box; a cam made on one end of the sleeve serving a double purpose namely, to cover over the box opening, and to coact against the aforesaid rib; and a tool-head made on the other end of the sleeve projecting beyond the rim of the box wall, by which it is rotated to operate the cam against the rib.

5. A cable connecter comprising a sleeve, a tool-head made on the sleeve by which it is rotated, said sleeve provided with a box wall entrant slot adapted to perform the double purpose of holding the connecter against longitudinal movement in a box and at the same time permitting a box edge to reach through the sleeve and bear against a cable therein, and a cam on the sleeve having an effective bearing surface substantially parallel to the sleeve axis which when turned acts to render effective the aforesaid double purpose entrant slot.

6. A cable connecter comprising a sleeve into which a cable is inserted, said sleeve made with a box edge entrant slot over which the cable lies and which slot is adapted to register with the edge of a cable opening in a box, a cam made on one end of the sleeve and having an effective bearing surface substantially parallel to the axis of the sleeve, and a tool-head made on the other end of the sleeve.

7. In combination, an electric fixture box provided with a round cable opening into which a cable end is introduced, a sleeve received into the round cable opening and adapted to surround the cable, a tool-head on the sleeve by which the sleeve may be rotated, said sleeve provided with an entrant slot over which the cable lies and said slot receiving the edge of the cable opening to hold the sleeve against longitudinal movement relatively to the box, means carried on the sleeve by which said sleeve is displaced in relation to the box when said sleeve is rotated, said box also including means adjacent the opening with which said means coacts to produce lateral relative motion between the sleeve and box to secure the cable to the box.

8. A cable connecter comprising a sleeve, a tool-head made on the sleeve by which it is rotated, said sleeve provided with a box wall entrant slot adapted to perform the double purpose of holding the connecter against longitudinal movement in the box and at the same time permitting a box hole edge to reach through the sleeve and bear against a cable therein, and a cam carried on the sleeve having an effective bearing surface substantially parallel to the axis of the sleeve, and said cam being sufficiently large as to cover over a box hole.

9. A combination cable box and connecter therefor, comprising a box provided with cable receiving openings, a rib integral with the outside wall of the box and adapted to abut against the wall of a building structure to which the box is attached thereby affording clearance between the box wall and building structure, a sleeve connecter inserted in the box opening and adapted to receive a cable end, said sleeve being provided with an entrant slot therein across which the cable lies and said slot receiving the edge of the box opening, and a cam integral with one end of the sleeve resting in contact with the outside of the box wall within the aforesaid clearance afforded by the ribs and adapted to coact against the rib.

In testimony whereof I affix my signature.

HERMAN L. STRONGSON.